United States Patent
Khawaja et al.

(10) Patent No.: US 10,951,663 B2
(45) Date of Patent: Mar. 16, 2021

(54) SECURING AN IMS-BASED VOIP NETWORK WITH MULTIPLE VPNS

(71) Applicant: Saudi Arabian Oil Company, Dhahran (SA)

(72) Inventors: Kashif Khawaja, Dhahran (SA); Mudashiru Busari, Dhahran (SA); Baraka H. Mutairi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 32 days.

(21) Appl. No.: 16/273,645

(22) Filed: Feb. 12, 2019

(65) Prior Publication Data

US 2020/0259872 A1 Aug. 13, 2020

(51) Int. Cl.
| | | |
|---|---|---|
| *H04L 12/66* | (2006.01) | |
| *H04L 29/06* | (2006.01) | |
| *H04L 12/723* | (2013.01) | |
| *H04M 7/00* | (2006.01) | |

(52) U.S. Cl.
CPC .......... *H04L 65/1003* (2013.01); *H04L 45/50* (2013.01); *H04L 63/0272* (2013.01); *H04L 65/1016* (2013.01); *H04L 65/1033* (2013.01); *H04L 65/1046* (2013.01); *H04L 65/1069* (2013.01); *H04L 65/608* (2013.01); *H04M 7/006* (2013.01)

(58) Field of Classification Search
CPC .................................................. H04L 65/1003
See application file for complete search history.

(56) References Cited

U.S. PATENT DOCUMENTS

| | | | | |
|---|---|---|---|---|
| 7,649,848 B1 * | 1/2010 | Swan | ................... | H04L 12/2861 370/252 |
| 8,051,177 B1 * | 11/2011 | Mitchell | ............. | H04L 61/2564 709/227 |
| 8,169,903 B2 * | 5/2012 | Oz | ...................... | H04L 63/0272 370/231 |

(Continued)

FOREIGN PATENT DOCUMENTS

| | | |
|---|---|---|
| WO | 2014056511 | 4/2014 |
| WO | 2018231109 | 12/2018 |

OTHER PUBLICATIONS

PCT International Search Report and Written Opinion in International Appln. PCT/US2020/017549, dated Apr. 20, 2020, 14 pages.

*Primary Examiner* — Guang W Li
(74) *Attorney, Agent, or Firm* — Fish & Richardson P.C.

(57) ABSTRACT

Systems and methods include a method for securing an Internet protocol (IP) Multimedia Subsystem (IMS)-based voice over IP (VoIP) network with multiple virtual private networks (VPNs). A call sent by a first user endpoint (UE) to a second UE is received by a SBC. The SBC provides security for an IMS-based VoIP network and controls traffic between a first VPN connecting IMS core servers, a second VPN connecting IP phones, and a third VPN connecting non-IP-phone devices. The call originates from either of the second VPN connecting the IP phones or from the third VPN connecting the non-IP-phone devices. A signaling for the call is encrypted and routed by the SBC to the second UE. A media flow for the call is encrypted and routed by the SBC through the third VPN before routing the call to the second UE.

20 Claims, 7 Drawing Sheets

(56) References Cited

U.S. PATENT DOCUMENTS

| | | | | |
|---|---|---|---|---|
| 8,228,861 B1* | 7/2012 | Nix | H04L 65/1069 | 370/329 |
| 8,503,334 B2* | 8/2013 | Hines | H04L 49/354 | 370/255 |
| 9,178,773 B1* | 11/2015 | Tassone | G06F 3/0481 | |
| 9,185,626 B1* | 11/2015 | Kunkel | H04L 65/1069 | |
| 9,473,581 B2* | 10/2016 | Gangadharan | H04L 67/141 | |
| 2003/0169730 A1* | 9/2003 | Narasimhan | H04M 3/53366 | 370/355 |
| 2004/0223464 A1* | 11/2004 | Dye | H04M 3/567 | 370/260 |
| 2004/0223500 A1* | 11/2004 | Sanderson | H04L 63/0272 | 370/395.53 |
| 2004/0260747 A1* | 12/2004 | Ying | H04M 3/42323 | 709/200 |
| 2006/0187900 A1* | 8/2006 | Akbar | H04M 7/0066 | 370/352 |
| 2007/0019545 A1* | 1/2007 | Alt | H04L 29/125 | 370/230 |
| 2007/0036151 A1* | 2/2007 | Baeder | H04L 29/06027 | 370/352 |
| 2007/0211715 A1 | 9/2007 | Khouderchah et al. | | |
| 2007/0211716 A1* | 9/2007 | Oz | H04L 12/4641 | 370/389 |
| 2008/0307519 A1* | 12/2008 | Curcio | H04L 63/0272 | 726/15 |
| 2009/0154463 A1* | 6/2009 | Hines | H04L 29/0836 | 370/392 |
| 2010/0107230 A1* | 4/2010 | Tyagi | H04L 65/1069 | 726/6 |
| 2010/0154057 A1* | 6/2010 | Ko | H04L 65/1006 | 726/23 |
| 2011/0302408 A1* | 12/2011 | McDermott | H04L 65/104 | 713/153 |
| 2012/0180121 A1* | 7/2012 | Yussouff | H04L 65/1069 | 726/15 |
| 2012/0287922 A1* | 11/2012 | Heck | H04L 65/1069 | 370/351 |
| 2013/0205033 A1* | 8/2013 | Peter | H04L 65/1069 | 709/228 |
| 2014/0344913 A1* | 11/2014 | Stahl | H04L 65/1006 | 726/11 |
| 2015/0074259 A1* | 3/2015 | Ansari | H04L 67/02 | 709/224 |
| 2015/0347683 A1* | 12/2015 | Ansari | H04L 9/30 | 726/7 |
| 2015/0381515 A1* | 12/2015 | Mattson | H04L 47/70 | 707/609 |
| 2016/0189315 A1* | 6/2016 | Anania | G06Q 50/01 | 705/319 |
| 2017/0054770 A1* | 2/2017 | Wells | H04L 65/1006 | |
| 2017/0126750 A1* | 5/2017 | Ku | H04L 65/1069 | |
| 2017/0359309 A1* | 12/2017 | Bolte | H04W 12/08 | |
| 2018/0019960 A1* | 1/2018 | Perga | H04M 7/006 | |
| 2019/0199676 A1* | 6/2019 | Ku | H04L 61/157 | |
| 2020/0028690 A1* | 1/2020 | Barakat | H04M 3/00 | |
| 2020/0067831 A1* | 2/2020 | Spraggins | H04L 45/306 | |

* cited by examiner

SECURING AN IMS-BASED VOIP NETWORK WITH MULTIPLE VPNS

BACKGROUND

The present disclosure applies to networks used for communication. Networks that are used for voice over Internet protocol (VoIP) can be implemented using technologies and methodologies that provide voice communications between users in one or more connected networks. However, vulnerabilities in VoIP networks can cause security concerns. Breaches in security can cause, for example, distributed denial of service (DDoS) attacks, eavesdropping, and privacy issues.

SUMMARY

The present disclosure describes techniques that can be used for securing an Internet protocol (IP) Multimedia Subsystem (IMS)-based voice over IP (VoIP) network with multiple virtual private networks (VPNs). In some implementations, a computer-implemented system includes one or more processors and a non-transitory computer-readable storage medium coupled to the one or more processors. The non-transitory computer-readable storage medium stores programming instructions for execution by the one or more processors, the programming instructions instructing the one or more processors to perform operations. The operations include the following. Using separate Internet protocol (IP) routing and forwarding domains, security is provided for an IP multimedia subsystem (IMS)-based voice over IP (VoIP) network. Providing security includes: encrypting messages between user endpoints (UEs) and a session border controller (SBC); routing signaling for a call between a first UE and a second UE through the SBC; and routing media flows for the call between the first UE and the second UE through the SBC for further messaging.

In some implementations, a computer-implemented method includes the following. A call sent by a first user endpoint (UE) to a second UE is received by a SBC. The SBC provides security for an IMS-based VoIP network and controls traffic between a first VPN connecting IMS core servers, a second VPN connecting IP phones, and a third VPN connecting non-IP-phone devices (including analog phones, for example). The call originates from either of the second VPN connecting the IP phones or from the third VPN connecting the non-IP-phone devices. A signaling for the call is encrypted and routed by the SBC to the second UE. A media flow for the call is encrypted and routed by the SBC through the third VPN before routing the call to the second UE.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, a secure network can be created for VoIP traffic by using existing networks. Second, calls can be encrypted to protect against distributed denial of service (DDoS) attacks and other security threats from internal and external users. Third, each existing VoIP network can be compartmentalized into multiple isolated networks in which the isolated networks communicate with each other only through hardened security devices. Fourth, the VoIP IMS networks can be secured end-to-end, internally and externally. Fifth, corporate classified information and corporate intellectual property can be protected.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for securing an Internet protocol (IP) multimedia subsystem (IMS)-based voice over IP (VoIP) network with multiple virtual private networks (VPNs). Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Techniques of the present disclosure include the use of multiprotocol label switching (MPLS) Layer 3 VPN techniques for securing a $3^{rd}$-generation partnership project (3GPP) IMS-based VoIP network. The network can provide geographically redundant core call processing sites in an enterprise network. The techniques can take advantage of Layer-3 level segregation provided by the MPLS technologies. The segregation can exist while keeping existing security measures (encryption and network firewalls) in place. The core (main) IMS call processing sites can be isolated in a dedicated MPLS Layer-3 VPN architecture. Users can be contained in separate VPNs, depending on the level of security controls established in their local environments. Furthermore, the techniques can require that last-mile signaling and media traffic be encrypted. The media traffic can include traffic between the user endpoints (UEs), such as traffic between IP phones and a perimeter security device (for example, a session border controller (SBC)).

The techniques can rely on the MPLS VPN to protect VoIP infrastructure. Protection can be provided by isolating the IMS and all associated critical components into a separate VPN. Further, additional user endpoints (UEs) can be isolated into additional VPNs. The SBC can be positioned in such a way that all communications between UEs and to the IMS backend systems use the SBC. In this way, the IMS is shielded from security vulnerabilities of the UEs.

Figure 1:
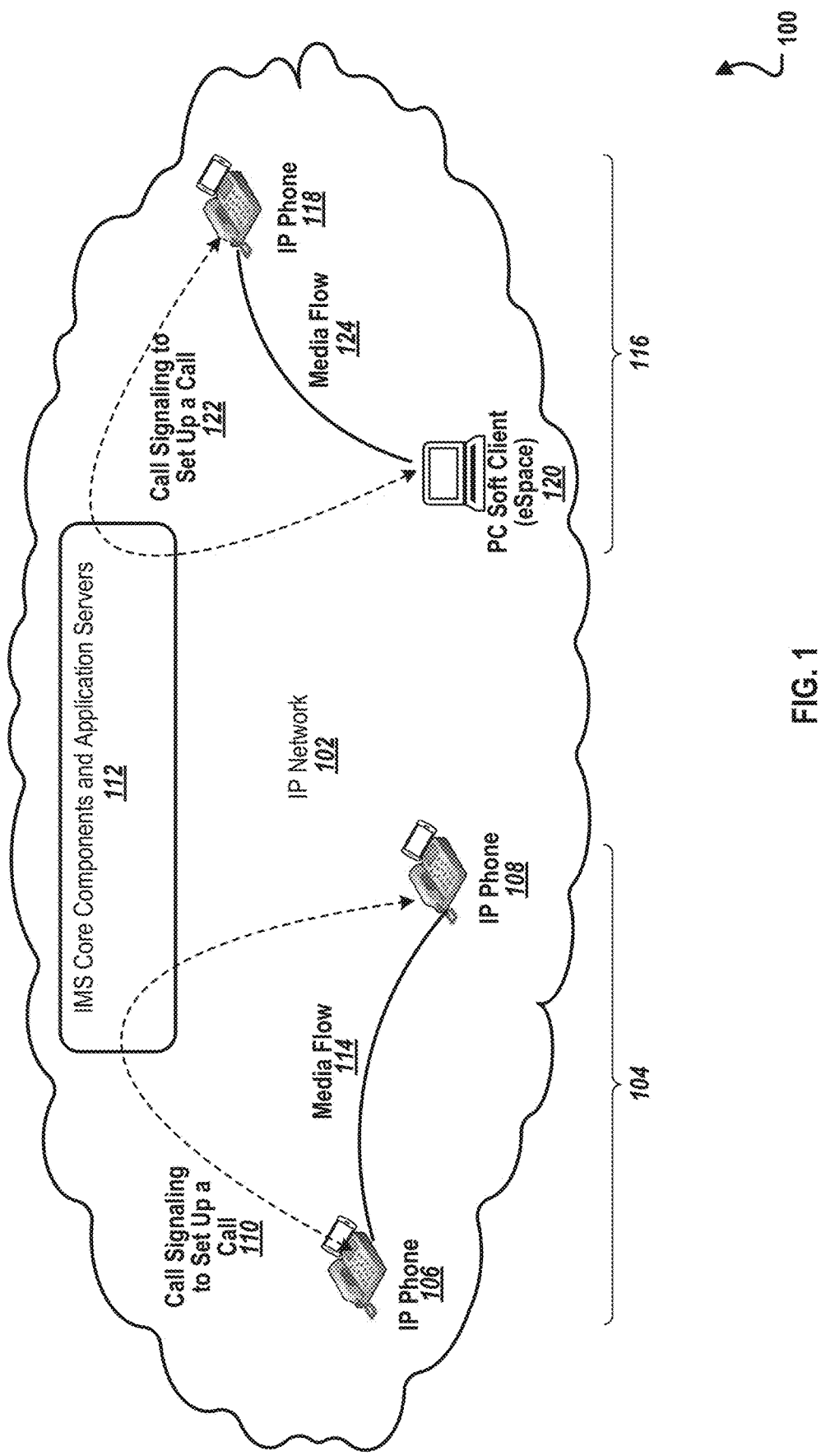
FIG. 1 is a block diagram showing an example of an architecture for message traffic in an IP network, according to some implementations of the present disclosure.

FIG. 1 is a block diagram showing an example of an architecture 100 for message traffic in an IP network 102, according to some implementations of the present disclosure. Although the architecture 100 represents conventional systems, components of the architecture 100 can be used in the present disclosure.

The architecture 100 can be used in an IMS-based voice over IP (VoIP) network in which phones communicate with a variety of servers for processing signaling (setting up) of calls and processing media (audio or video generated by users). For example, in a call 104 between an IP phone 106 and an IP phone 108, messaging can be used to signal and establish the call 104, as indicated by a call signaling line 110. Establishing the call 104 can involve the use of messaging that passes through IMS core components and application servers 112. Once the call 104 is established, media can be exchanged between the IP phone 106 and the IP phone 108, as indicated by a media flow line 114. In another example, in a call 116 between an IP phone 118 and a PC softphone client 120, messaging can be used to signal and establish the call 116, as indicated by a call signaling line 122. Establishing the call 116 can involve the use of messaging that passes through the IMS core components and application servers 112. Once the call 116 is established, media can be exchanged between the IP phone 118 and the PC softphone client 120, as indicated by a media flow line 124.

In some implementations of conventional systems represented by FIG. 1, companies can put all devices, including call processing servers and UEs, in a single flat network or VPN. This type of architecture can provide the UEs (including IP phones and PCs) with IP reachability to call processing servers. However, this type of architecture can expose the network to various security threats, especially if one or more of the UEs have been compromised. One way to mitigate this problem is to mandate that UEs are configured to communicate with only one specified server. In turn, the specified server can communicate with other servers to help process calls. However, this solution cannot completely prevent the UEs from reaching the IMS call processing servers and other application servers.

Figure 2:
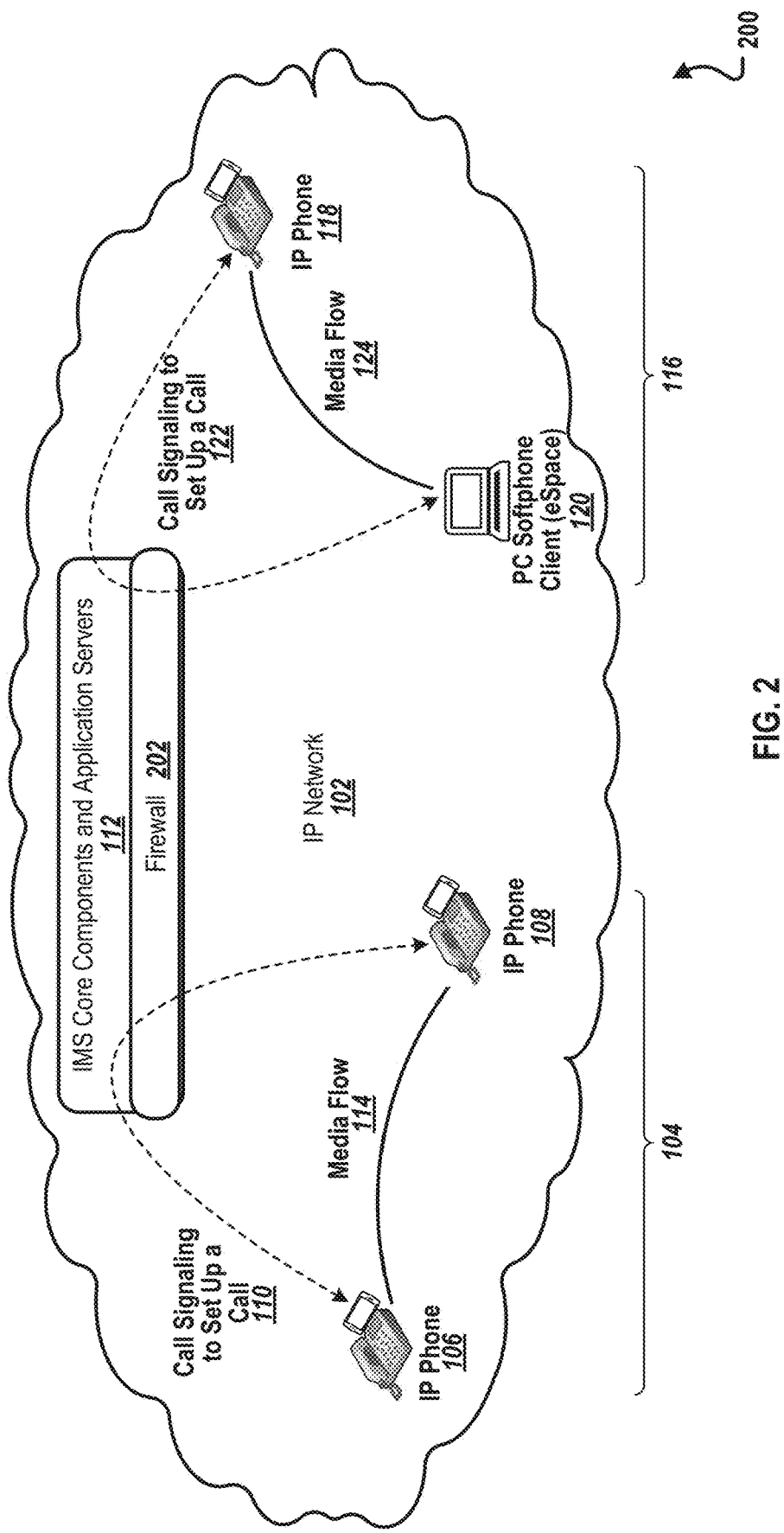
FIG. 2 is a block diagram showing an example of an architecture for message traffic in an IP network using a firewall, according to some implementations of the present disclosure.

FIG. 2 is a block diagram showing an example of an architecture 200 for message traffic in an IP network using a firewall 202, according to some implementations of the present disclosure. The architecture 200 builds upon the architecture 100, with the addition of the firewall 202. In the architecture 200, block communications between the UEs (including the IP phones 106, 108, and 118, and the PC softphone client 120) and the rest of the IMS servers includes the use of the firewall 202 that is inserted between the UEs and servers of the IMS core components and application servers 112. The architecture 200 also represents conventional systems.

While techniques used with respect to the architectures 100 and 200 can address smaller scale implementations and a relatively simple user-base, problems can occur. For example, a more sophisticated user may be still able to exploit the IP network 102 to launch malicious DDoS attempts on the IMS core components and application servers 112. This can happen because IP routing between elements of the architectures 100 and 200 still exists.

Figure 3:
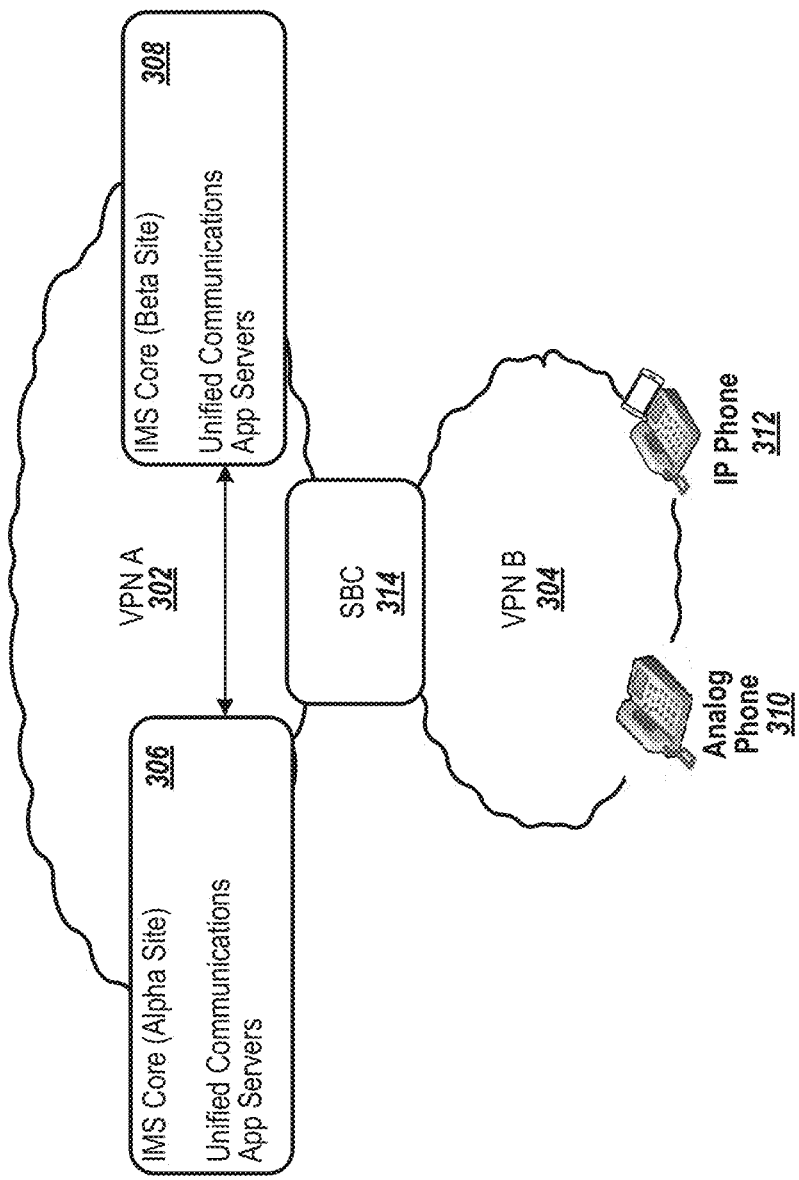
FIG. 3 is a block diagram showing an example of an architecture for message traffic using closed virtual private networks (VPNs), according to some implementations of the present disclosure.

FIG. 3 is a block diagram showing an example of an architecture 300 for message traffic using closed VPNs, according to some implementations of the present disclosure. The closed VPNs can include a VPN 302 (VPN "A") and a VPN 304 (VPN "B"). The VPN 302 can be a closed VPN that contains IMS core and application servers 306 and 308. The servers 306 and 308 can be located in geographically diverse locations (for example, Alpha and Beta sites) that are allowed to communicate with each other without the need of firewalls. The VPN 304 can contain devices such as an analog phone 310 and an IP phone 312. Messaging between the VPN 302 and the VPN 304 can pass through an SBC 314.

The architecture 300 provides a few additional measures to provide end-to-end security by protecting the IMS core network and application servers from the users. For example, MPLS Layer-3 VPN technology can be used, and traffic between the UEs and the perimeter security device (SBC) can be encrypted. This allows the IMS core network to be protected from the rest of the corporate network, which is critical in voice and multimedia call processing. For example, the IMS core and application servers can be contained in a dedicated MPLS Layer-3 VPN (for example, the VPN 302).

IP routing does not occur between the VPN 302 and any other VPNs. Instead, the VPN 302 can be bridged to other Layer-3 MPLS VPNs through a security device, commonly known as a session border controller (SBC). The SBC can be specially designed for SIP-based and RTP-based applications. Strict security measures can be implemented in the SBC to control flows of traffic (especially SIP and RTP) between the UEs and the IMS core servers. The SBC can allow stateful communication between the UEs and the IMS servers for audio and video. The SBC can also allow additional management and monitoring traffic.

Figure 4A:
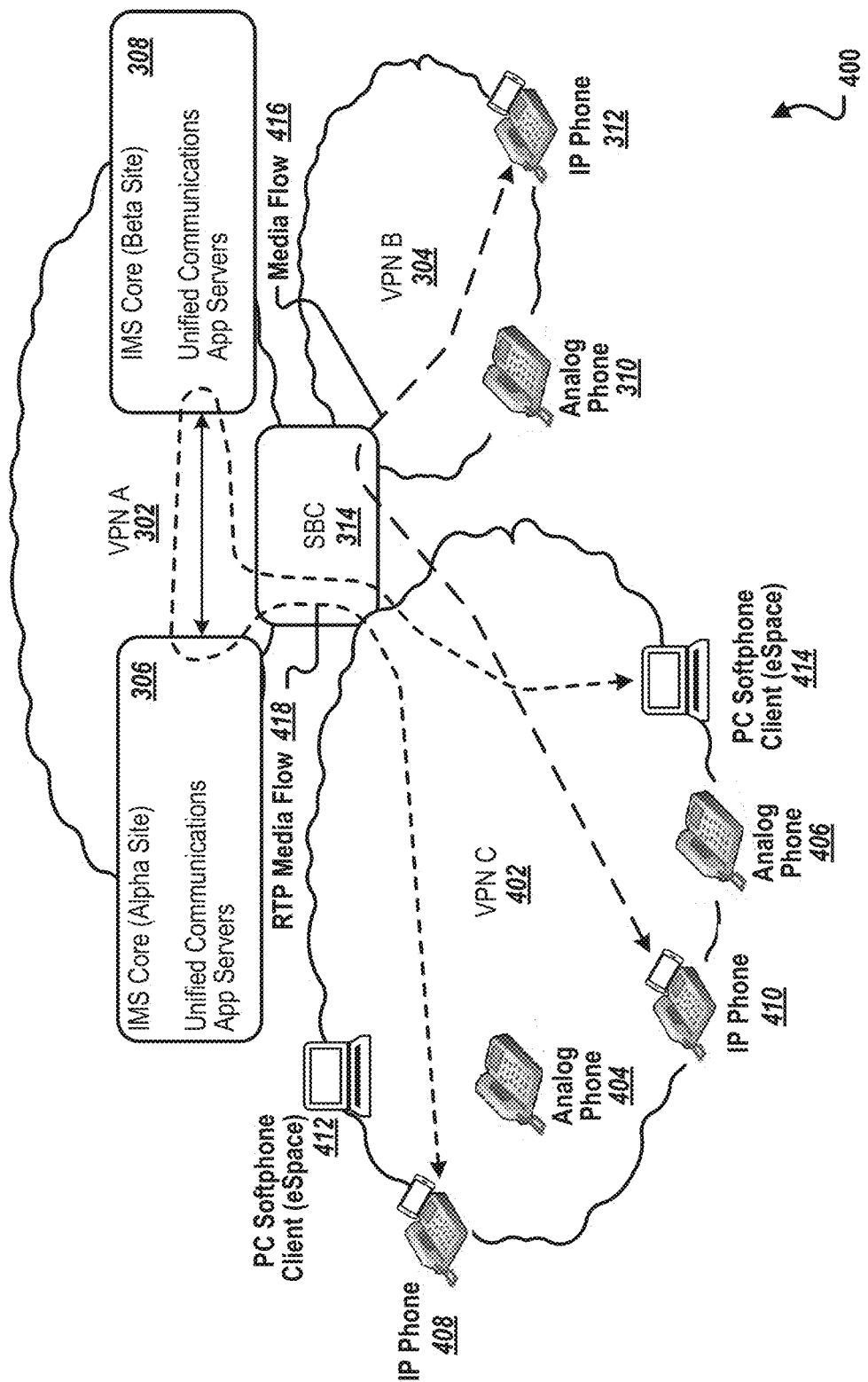
FIG. 4A is a block diagram showing an example of an architecture for message traffic using three VPNs, according to some implementations of the present disclosure.

FIG. 4A is a block diagram showing an example of an architecture 400 for message traffic using three VPNs, according to some implementations of the present disclosure. The architecture 400 builds on the features of the architecture 300. In addition to the VPNs 302 and 304, the architecture 400 includes a VPN 402 that can be used to isolate all-inclusive devices (for example, softphone clients, personal computers (PCs), smart alarm/alerting devices, smart emergency services devices, smart watches, smart bracelets, and handheld devices). Devices can dial out through a VoIP system when a preprogrammed incident is detected at a given site.

The architecture 400 can support techniques that include the following key features. Encryption can be used for communications between the UEs and their first points-of-contact in the VoIP network, which can be, for example, the SBC 314. IP routing and forwarding domains can be separate and can each contain multiple networks. A minimum of three dedicated and non-overlapping VPNs can be mandated. The VPNs can include a first dedicated VPN (for example, the VPN 302) for IMS core servers. A second dedicated VPN (for example, the VPN 304) can be used for IP phones (and session initiation protocol (SIP)-converted analog phones). At least one third VPN (for example, the VPN 402) can be used to isolate all-inclusive devices (for example, softphone clients, personal computers (PCs), smart alarm/alerting devices, smart emergency services devices, smart watches, smart bracelets, and handheld devices). As an example, the all-inclusive devices can include analog phones 404 and 406, IP phones 408 and 410, and PC softphone clients 412 and 414. In some implementations, the VPN 402 can be divided into multiple small VPNs based on one or both of geographic needs and organizational functions. The use of at least three VPNs 302, 304, and 402 can provide an additional layer of security for the IMS core (and its application servers) and the dedicated UEs such as the IP phones. The SBC 314 can operate as a security device that controls VoIP traffic between any two VPNs. This can help to contain DDoS attacks, viruses, and threats originating in their respective domains. Because voice is considered to be a critical service, a higher layer of security can be applied to voice-related terminals and servers. Analog phones can be connected to media gateway devices that can convert voice traffic to IP in order to be processed by the IMS network. In some instances, for example, due to IP infrastructure limitations in some departments, geographical locations, and technologies, some IP phones may not be able to be accommodated in VPN 304. This situation can make devices that are part of a network group (for example, VPN 402) less secure than phone-dedicated-networks (for example, VPN 304).

In some implementations, larger network clouds can further segregate the VPNs used by UEs, for example to reduce the size of the routing table. Maintaining a smaller routing table can reduce the risk of network-wide impacts caused by smaller isolated incidents.

In some implementations, multipurpose UEs can be placed in smaller general purpose VPNs. The multipurpose UEs can include, for example, IP soft clients on corporate PCs and hard IP phones which cannot be placed in VPN C for any reason. The selection of the smaller general purpose VPNs that are to be used can be based on geographic needs and organizational functions, for example. These VPNs can support locations where, for example, multiple types of corporate user devices such as PCs, printers, mobile devices, smart alarm/alerting devices, smart emergency services devices, smart watches, smart bracelets, and handheld devices are used. These types of VPNs can also provide connectivity to external networks, including the Internet. These general purpose VPNs can be, by nature, less secured. Voice and multimedia devices in these VPNs need to go through the SBC 314 to reach the IMS Core servers. That is why bridging provided by the SBC 314 needs to touch all of the general purpose VPNs. VPN C is an example of such VPNs. All phones and voice/video softphone clients can communicate with each other through the SBC 314.

Communications between the UEs and their SBCs can be encrypted. For example, secure RTP can be used instead of RTP, and secure SIP can be used instead of SIP. The VPN 302 can communicate with phones in VPN 402 through the SBC 314. The UEs can be configured with (and can be aware only of) an IP address of the SBC 314. Also, the IMS servers can only reach and access their side of the SBC 314. This restriction of communications can provide an added benefit of hiding the topology of the IMS VPN (the VPN 302) from the other VPNs. A media flow line 416 shows communication between the IP phone 312 and the IP phone 410).

Figure 4B:
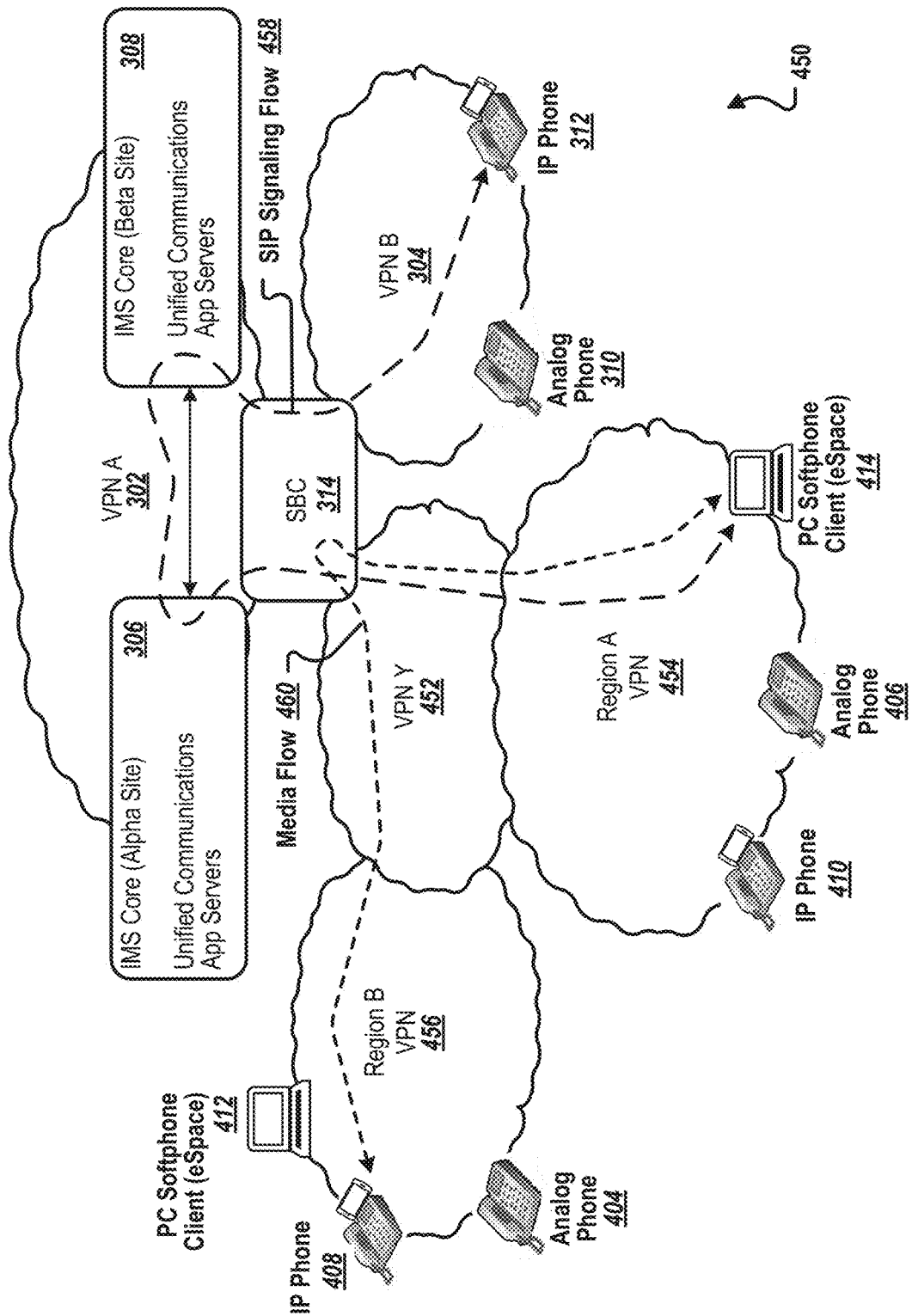
FIG. 4B is a block diagram showing an example of an architecture for message traffic using multiple VPNs, according to some implementations of the present disclosure.

FIG. 4B is a block diagram showing an example of an architecture 450 for message traffic using multiple VPNs, according to some implementations of the present disclosure. Although similar to the architecture 400, the architecture 450 includes a VPN 452, a region A VPN 454, and a region B VPN 456. An SIP signaling flow 458 show a communication between the IP phone 312 and the PC softphone client 414. A media flow 460 shows a communication between the IP phone 408 and PC softphone client 414.

Figure 5:
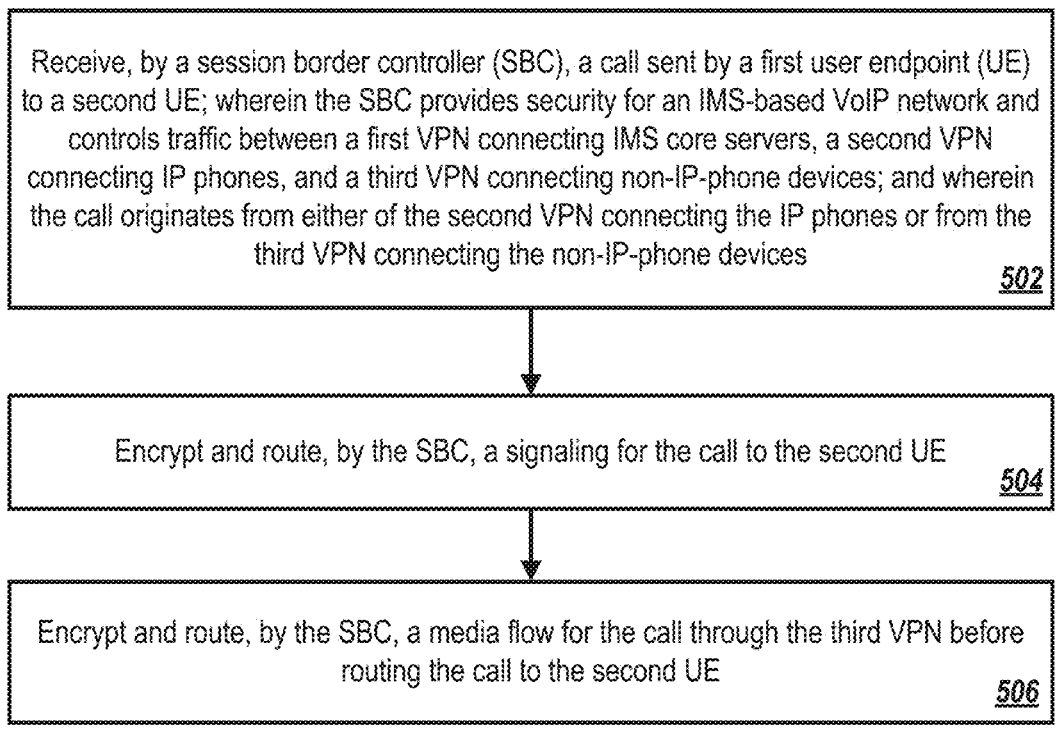
FIG. 5 is a flowchart of an example method for providing, using separate Internet protocol (IP) routing and forwarding domains, security for an IP multimedia subsystem (IMS)-based voice over IP (VoIP) network, according to some implementations of the present disclosure.

FIG. 5 is a flowchart of an example method 500 for providing, using separate IP routing and forwarding domains, security for an IMS-based voice over IP (VoIP) network, according to some implementations of the present disclosure. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 500 can be run in parallel, in combination, in loops, or in any order.

At 502, a call sent by a first user endpoint (UE) to a second UE is received by a session border controller (SBC). For example, a call between the IP phone 312 and the soft client 414 can be handled by the SBC 314, as described with reference to FIG. 4A. The SBC 314 can provide security for an IMS-based VoIP network (for example, represented by the architecture 400) and controls traffic between a first VPN (for example, the VPN 302) connecting IMS core servers, a second VPN (for example, the VPN 304) connecting IP phones, and a third VPN (for example, the VPN 402) connecting non-IP-phone devices (including analog phones, for example). The call can originate from a UE in either of the second VPN connecting the IP phones or from the third VPN connecting the non-IP-phone devices. Segments/legs between UEs and the SBC can also be encrypted, for example, using secure SIP for signaling and secure real-time transport protocol SRIP) for media. From 502, method 500 proceeds to 504.

At 504, a signaling for the call is encrypted and routed by the SBC to the second UE. As an example, the SBC 314 can encrypt the call and propagate signaling to the soft client 414. From 504, method 500 proceeds to 506.

At 506, a media flow for the call is encrypted and routed by the SBC through the third VPN before routing the call to the second UE. For example, media flow for the call can follow the media flow line 460 representing the messaging flow for the call between the IP phone 408 and the PC softphone client 414. After 506, method 500 can stop.

Figure 6:
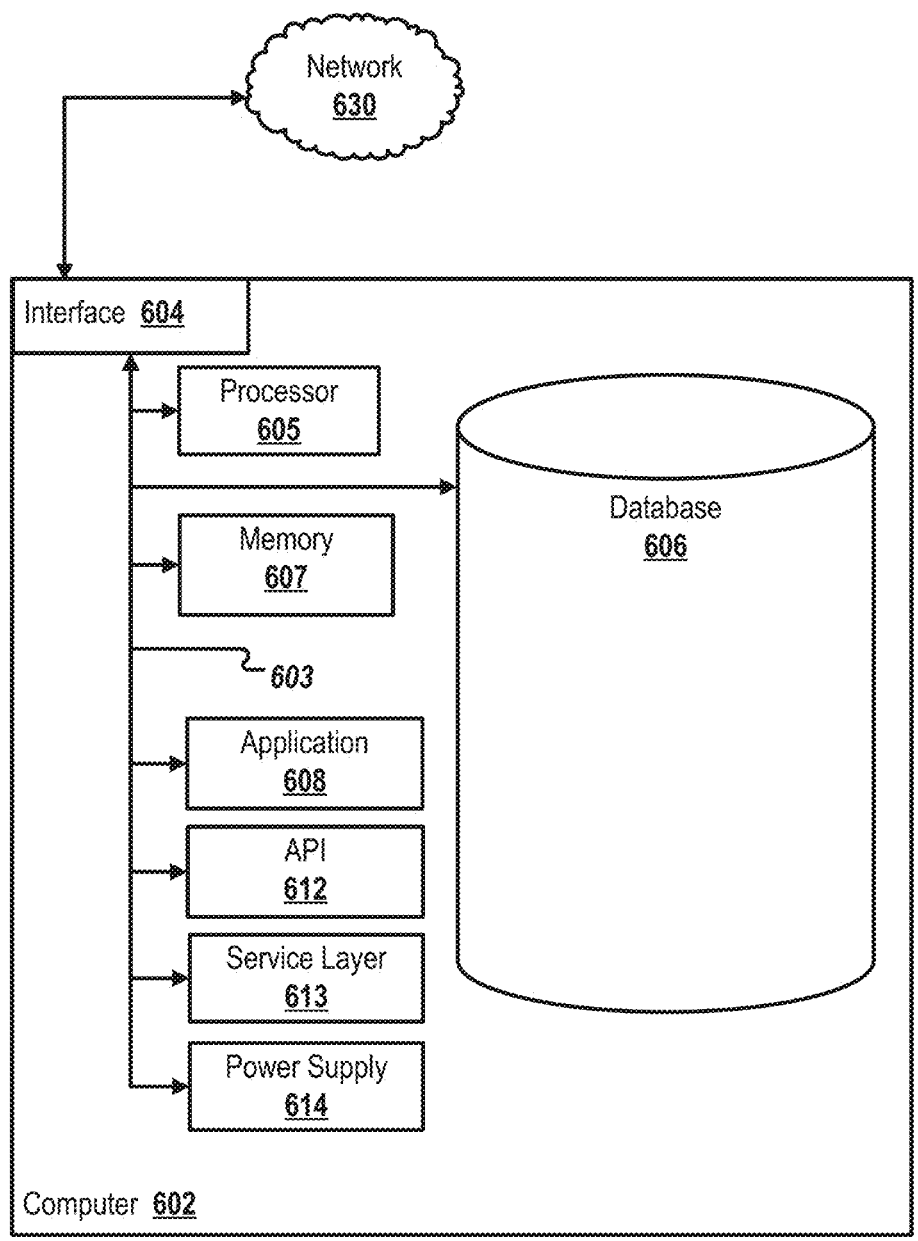
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

For example, in a first implementation, a computer-implemented system includes one or more processors and a non-transitory computer-readable storage medium coupled to the one or more processors. The non-transitory computer-readable storage medium stores programming instructions for execution by the one or more processors, the programming instructions instructing the one or more processors to perform operations. The operations include the following. Using separate Internet protocol (IP) routing and forwarding domains, security is provided for an IP multimedia subsystem (IMS)-based voice over IP (VoIP) network. Providing security includes: encrypting messages between user endpoints (UEs) and a session border controller (SBC); routing signaling for a call between a first UE and a second UE through the SBC; and routing media flows for the call between the first UE and the second UE through the SBC for further messaging.

The foregoing and other described implementations can each, optionally, include one or more of the following features:

A first feature, combinable with any of the following features, where the non-IP-phone devices include softphone clients, personal computers (PCs), smart alarm/alerting devices, smart emergency services devices, smart watches, smart bracelets, and handheld devices.

A second feature, combinable with any of the previous or following features, where messages and routing are sent through networks determined based on one or more of geographic needs and organizational functions.

A third feature, combinable with any of the previous or following features, where the SBC is implemented using multiprotocol label switching (MPLS) technologies.

A fourth feature, combinable with any of the previous or following features, where the system further includes analog phones connected to media gateway devices converting voice traffic to IP traffic for processing by an IMS network.

A fifth feature, combinable with any of the previous or following features, where the messages between the UEs and their SBCs are encrypted using secure real-time transport protocol (SRTP) and secure session initiation protocol (SIP).

A sixth feature, combinable with any of the previous or following features, where a media flow between the first UE and the second UE occurs without being routed through the SBC after the SBC has established the signaling.

In a second implementation, a computer-implemented method includes the following. A call sent by a first user endpoint (UE) to a second UE is received by a SBC. The SBC provides security for an IMS-based VoIP network and controls traffic between a first VPN connecting IMS core servers, a second VPN connecting IP phones, and a third VPN connecting non-IP-phone devices. The call originates from either of the second VPN connecting the IP phones or from the third VPN connecting the non-IP-phone devices. A signaling for the call is encrypted and routed by the SBC to the second UE. A media flow for the call is encrypted and routed by the SBC through the third VPN before routing the call to the second UE.

The foregoing and other described implementations can each, optionally, include one or more of the following features:

A first feature, combinable with any of the following features, where the non-IP-phone devices include softphone clients, personal computers (PCs), smart alarm/alerting devices, smart emergency services devices, smart watches, smart bracelets, and handheld devices.

A second feature, combinable with any of the following features, where the third VPN includes two or more third VPNs determined based on one or more of geographic needs and organizational functions.

A third feature, combinable with any of the following features, where the SBC is implemented using multiprotocol label switching (MPLS) technologies.

A fourth feature, combinable with any of the following features, where the method further includes converting, by analog phones connected to media gateway devices, voice traffic to IP traffic for processing by an IMS network.

A fifth feature, combinable with any of the following features, where the messages between the UEs and their SBCs are encrypted using secure real-time transport protocol (SRT and secure session initiation protocol (SIP).

A sixth feature, combinable with any of the following features, where a media flow between the first UE and the second UE occurs without being routed through the SBC after the SBC has established the signaling.

In a third implementation, a non-transitory, computer-readable medium stores one or more instructions executable by a computer system to perform operations comprising the following. A call sent by a first user endpoint (UE) to a second UE is received by a SBC. The SBC provides security for an IMS-based VoIP network and controls traffic between a first VPN connecting IMS core servers, a second VPN connecting IP phones, and a third VPN connecting non-IP-phone devices. The call originates from either of the second VPN connecting the IP phones or from the third VPN connecting the non-IP-phone devices. A signaling for the call is encrypted and routed by the SBC to the second UE. A media flow for the call is encrypted and routed by the SBC through the third VPN before routing the call to the second UE.

The foregoing and other described implementations can each, optionally, include one or more of the following features:

A first feature, combinable with any of the following features, where the non-IP-phone devices include softphone clients, personal computers (PCs), smart alarm/alerting devices, smart emergency services devices, smart watches, smart bracelets, and handheld devices.

A second feature, combinable with any of the following features, where the third VPN includes two or more third VPNs determined based on one or more of geographic needs and organizational functions.

A third feature, combinable with any of the following features, where the SBC is implemented using multiprotocol label switching (MPLS) technologies.

A fourth feature, combinable with any of the following features, where the method further includes converting, by analog phones connected to media gateway devices, voice traffic to IP traffic for processing by an IMS network.

A fifth feature, combinable with any of the following features, where the messages between the UEs and their SBCs are encrypted using secure real-time transport protocol (SRTP) and secure session initiation protocol (SIP).

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
receiving, by a session border controller (SBC), a call sent by a first user endpoint (UE) to a second UE; wherein the SBC provides security for an internet protocol multimedia subsystem (IMS)-based Voice over IP (VoIP) network and controls traffic between a first virtual private network (VPN) connecting IMS core servers, a second VPN connecting IP phones, and a third VPN connecting and isolating all-inclusive devices; wherein the SBC provides separate Internet protocol (IP) routing and forwarding domains; and wherein the call originates from either of the second VPN connecting the IP phones or from the third VPN connecting and isolating the all-inclusive devices;
encrypting messages between UEs and the SBC, including a signaling for the call to the second UE;
routing the signaling for the call between the first UE and the second UE; and
routing, by the SBC, a media flow for the call through the third VPN before routing the call to the second UE independent of routing through the IMS-based VoIP network.

2. The computer-implemented system of claim 1, wherein the all-inclusive devices include softphone clients, personal computers (PCs), smart alarm/alerting devices, smart emergency services devices, smart watches, smart bracelets, and handheld devices.

3. The computer-implemented system of claim 1, wherein messages and routing are sent through networks determined based on one or more of geographic needs and organizational functions.

4. The computer-implemented system of claim 1, wherein the SBC is implemented using multiprotocol label switching (MPLS) technologies.

5. The computer-implemented system of claim 1, further comprising analog phones connected to media gateway devices converting voice traffic to IP traffic for processing by an IMS network.

6. The computer-implemented system of claim 1, wherein the messages between the UEs and their SBCs are encrypted using secure real-time transport protocol (SRTP) and secure session initiation protocol (SIP).

7. The computer-implemented system of claim 1, wherein a media flow between the first UE and the second UE occurs without being routed through the SBC after the SBC has established the signaling.

8. A computer-implemented method, comprising:
receiving, by a session border controller (SBC), a call sent by a first user endpoint (UE) to a second UE; wherein the SBC provides security for an internet protocol multimedia subsystem (IMS)-based Voice over IP (VoIP) network and controls traffic between a first virtual private network (VPN) connecting IMS core servers, a second VPN connecting IP phones, and a third VPN connecting and isolating all-inclusive devices; wherein the SBC provides separate Internet protocol (IP) routing and forwarding domains; and wherein the call originates from either of the second VPN connecting the IP phones or from the third VPN connecting and isolating the all-inclusive devices;
encrypting messages between UEs and the SBC, including a signaling for the call to the second UE;
routing the signaling for the call between the first UE and the second UE; and
routing, by the SBC and independent of being routed through the IMS-based VoIP network, a media flow for the call through the third VPN before routing the call to the second UE.

9. The computer-implemented method of claim 8, wherein the all-inclusive devices include softphone clients, personal computers (PCs), smart alarm/alerting devices, smart emergency services devices, smart watches, smart bracelets, and handheld devices.

10. The computer-implemented method of claim 8, wherein the third VPN includes two or more third VPNs determined based on one or more of geographic needs and organizational functions.

11. The computer-implemented method of claim 8, wherein the SBC is implemented using multiprotocol label switching (MPLS) technologies.

12. The computer-implemented method of claim 8, further comprising converting, by analog phones connected to media gateway devices, voice traffic to IP traffic for processing by an IMS network.

13. The computer-implemented method of claim 8, wherein the messages between the UEs and their SBCs are encrypted using secure real-time transport protocol (SRTP) and secure session initiation protocol (SIP).

14. The computer-implemented method of claim 8, wherein a media flow between the first UE and the second UE occurs without being routed through the SBC after the SBC has established the signaling.

15. A non-transitory, computer-readable medium storing one or more instructions executable by a computer system to perform operations comprising:
receiving, by a session border controller (SBC), a call sent by a first user endpoint (UE) to a second UE; wherein the SBC provides security for an internet protocol multimedia subsystem (IMS)-based Voice over IP (VoIP) network and controls traffic between a first virtual private network (VPN) connecting IMS core servers, a second VPN connecting IP phones, and a third VPN connecting and isolating all-inclusive devices; wherein the SBC provides separate Internet protocol (IP) routing and forwarding domains; and wherein the call originates from either of the second VPN connecting the IP phones or from the third VPN connecting and isolating the all-inclusive devices;
encrypting messages between UEs and the SBC, including a signaling for the call to the second UE;
routing the signaling for the call between the first UE and the second UE; and
routing, by the SBC and independent of being routed through the IMS-based VoIP network, a media flow for the call through the third VPN before routing the call to the second UE.

16. The non-transitory, computer-readable medium of claim 15, wherein the all-inclusive devices include softphone clients, personal computers (PCs), smart alarm/alerting devices, smart emergency services devices, smart watches, smart bracelets, and handheld devices.

17. The non-transitory, computer-readable medium of claim 15, wherein the third VPN includes two or more third VPNs determined based on one or more of geographic needs and organizational functions.

18. The non-transitory, computer-readable medium of claim 15, wherein the SBC is implemented using multiprotocol label switching (MPLS) technologies.

19. The non-transitory, computer-readable medium of claim 15, the operations further comprising converting, by analog phones connected to media gateway devices, voice traffic to IP traffic for processing by an IMS network.

20. The non-transitory, computer-readable medium of claim 15, wherein the messages between the UEs and their SBCs are encrypted using secure real-time transport protocol (SRTP) and secure session initiation protocol (SIP).

\* \* \* \* \*